Nov. 4, 1930.  R. NEEF  1,780,762

TRANSMISSION LOCK AND INTERLOCK

Filed May 2, 1925

Inventor
Robert Neef
By Blackmore, Spencer & Hulse
Attorney

Patented Nov. 4, 1930

1,780,762

UNITED STATES PATENT OFFICE

ROBERT NEEF, OF DETROIT, MICHIGAN, ASSIGNOR TO GENERAL MOTORS CORPORATION, OF DETROIT, MICHIGAN, A CORPORATION OF DELAWARE

TRANSMISSION LOCK AND INTERLOCK

Application filed May 2, 1925. Serial No. 27,506.

The object of this invention is to provide a simple form of interlock for controlling members which is preferably so arranged that, if desired, a locking device may be combined therewith in a very simple manner. The interlock is also preferably of such form as to serve as a detent to hold the controlling members in any one of the operative positions and to limit the extent of movement of said controlling members.

The construction finds special application in automobile transmissions and is preferably used in connection with the ordinary slidable members which control the gears in such transmissions. In the preferred form I have provided these members with a series of oppositely facing notches and have provided an anti-friction member, preferably a ball bearing, for cooperation with said notches or with either of them and a stationary part in such a manner that simultaneous movement of both of said members is prevented, while when one of said members is shifted the other is held in position. By its engagement with said notches the ball also serves as a detent to hold the parts in adjusted relation. To enable the ball to accomplish these functions I have provided a follower device which exerts a pressure upon said ball, either by the action of gravity or of a spring, or both, to hold the ball in engagement with the notches. I have also preferably so constructed my interlock that the holding of the idle controlling member during the movement of the other is positive. This I have accomplished by the provision of stops for the follower to limit its movement to an amount which is not sufficient to enable the ball to clear the unshifted operating member.

I have also preferably provided a lock to hold the follower in its lowermost position, that is, with the ball in engagement with oppositely facing notches in the two controlling members, thus simultaneously locking both members against movement. Thus unauthorized operation of the car may be effectively prevented.

Referring now to the drawings.

Figure 1:
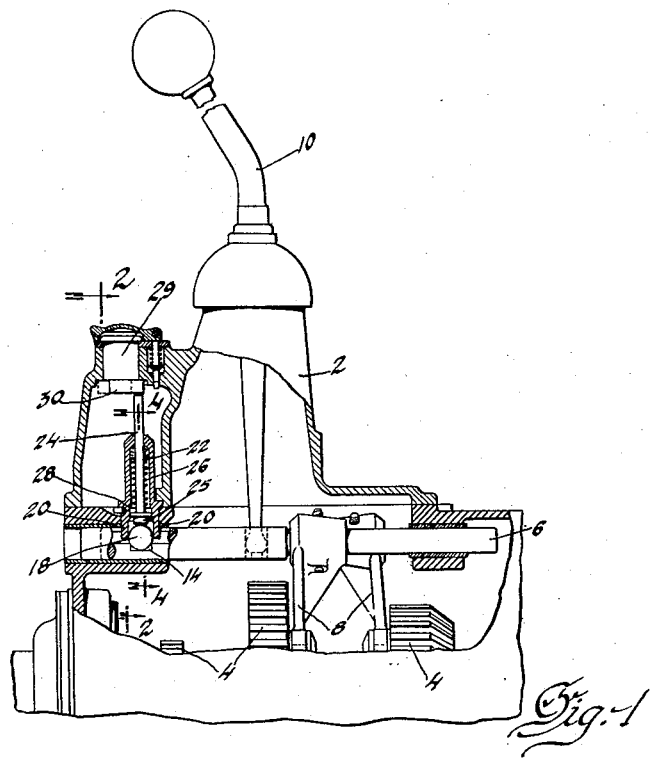
Figure 1 is a side elevation of a portion of an automobile transmission showing part of the casing broken away and parts of my combined lock and interlock in section.
Figure 2:
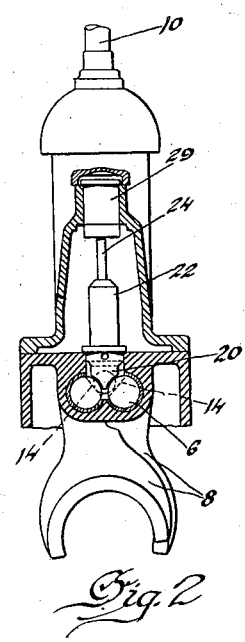
Figure 2 is a section on the line 2—2 of Figure 1.

On the drawing 2 indicates a portion of the casing which houses the transmission and its controlling members. I have shown certain of the transmission gears at 4 and the controlling members at 6. These members in the illustration consist of sliding rods carrying shifter forks 8 for moving the gears to various operative positions. The rods are, of course, guided in suitable bearings in the casing 2. To shift the controlling members 6 and consequently the transmission gears I have provided a gear shift lever 10, the lower end of which may engage either of the oppositely facing notches 12 in the members 6.

It is necessary to provide means to prevent movement of both of the rods and their corresponding gears at the same time and also to hold one of the rods stationary when the other is shifted. These two functons are accomplished by my interlock. Another function which it accomplishes is the yieldable holding of either of the shifting rods in any one of its operative positions of adjustment after the manner of a detent. A further function which it performs is to positively limit the extent of movement of the rods. I have also preferably so constructed my interlock that it may be thrown out of operation and will serve as a part of a positive locking means for holding both controlling members or rods against movement thus preventing unauthorized use of the car.

I shall now describe the interlock. Adjacent one of the bearings I have provided my controlling members 6 with a plurality of oppositely facing notches 14. These notches correspond to operative positions of the gears 4. The notches in each member are preferably connected by flattened portions 16.

With these notches and flattened portions an anti-friction member in the form of a ball 18 cooperates. This ball is prevented from moving in a direction lengthwise of the rods by the lugs 20 formed upon the bottom of a guide member 22. The member 22 serves as a guide for my follower member 24, the enlarged head 25 of which bears against the ball 18 and holds it in engagement with the notches 14 in the rods 6. This follower member may be gravity or spring urged, or both. I have shown it operated by both gravity and a coil spring 26 surrounding the stem of the member 24 and bearing at one end against one end of the guide member 22 and at the other end against the enlarged head 25 of the member 24.

I shall now state the operation of the structure so far described. If it be attempted to shift both rods 6 at the same time this is prevented by the ball 18 which in its normal position engages opposite notches 14 in the two bars and is held against movement by the stationary part 20. To move one of the rods it is necessary that the ball 18 be cammed into full seating engagement with one of the notches 14 in opposition to the follower 24 whereby the ball clears the other rod and permits its movement. Accordingly it is necessary to swing the gear shift lever 10 sidewise so that it engages one only of the notches 12 whereupon one of the rods 6 may be slid endwise to effect a shifting of gears. During this movement the ball 18 is, as previously stated, cammed into engagement with the notch in the idle rod 6 in opposition to the follower and by its engagement therewith and with the stationary part 20 prevents movement of the idle rod. The flats 16 provide the necessary clearance for the movement of the selected rod. When a rod 6 has been moved so that the ball is seated in one of the end notches of that rod no further movement of the latter is permitted for, with the flats at an end, there is insufficient clearance for its passage by the ball. Thus the structure described prevents simultaneous movement of both rods, holds one when the other is shifted and limits the amount of movement of the shifted rod.

I have preferred to make positive the locking of one rod when the other is moved and the locking of the shifted rod against further movement when the ball occupies an end notch, but this is not essential. To accomplish this I have provided the guide 22 with shoulders 28 which engage the head 25 of the follower 24. The amount of movement permitted the follower is just sufficient to allow the ball 18 to be moved sufficiently to clear the flats 16 on one of the rods when seated in a socket in the other.

I have also preferred to combine with the structure so far described a lock for locking both controlling members against movement, this is very simply done by the provision of a lock 29 of any preferred type having a bolt or other part 30 which may be placed in a position to hold the follower member 24 in its lowermost position. When this has been done the ball 18 is held in opposed notches in the two rods and it is impossible to cam the ball into a notch in one of the rods and thereby permit movement of the other.

Figure 3:
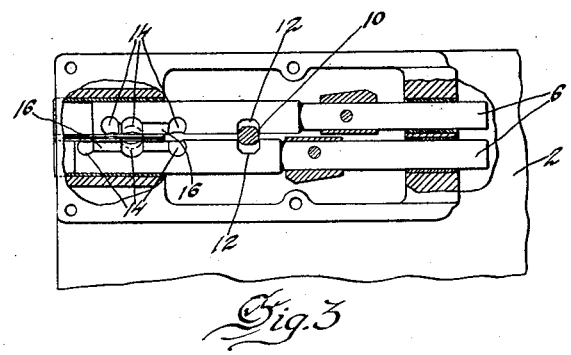
Figure 3 is a plan view partly in section showing the transmission controlling members and particularly the arrangement of notches therein.
Figure 4:
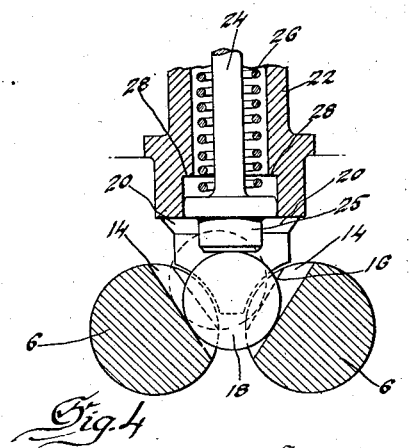
Figure 4 is a section on line 4—4 of Figure 1.

As shown in Fig. 3, the central notches 14 are of greater depth than the end notches. It is only when the ball 18 occupies the central notches that the plunger 24 extends downwardly far enough to permit bolt 30 of lock 29 to be swung to locked position and since in this position of the shifter rods the transmission is in neutral, it is impossible to lock the transmission in gear.

I claim:

1. The combination of a plurality of sliding members having notches formed therein, said members being cut away between said notches, a stationary part, means cooperating with said stationary part, said notches and said cut away portions adapted to lock one of said members in position when the other is moved and to limit the extent of movement of said members.

2. The combination of a plurality of slidable members, each provided with a plurality of notches in opposing faces, a stationary part, a unitary member loosely mounted in said stationary part and adapted to engage said notches, and means for yieldingly urging said member into engagement with said notches to yieldingly retain said members in adjusted position.

3. In the combination as defined by claim 2, said notches extending at diverging angles to provide a socket in which said member is received and supported.

4. In a transmission, the combination of a plurality of slidable gear shift members, each provided with a plurality of notches in opposing faces, a stationary part, a locking ball loosely mounted in said stationary part and adapted to engage a pair of opposed notches, means for yieldingly urging said ball into engagement with said notches to retain said members in adjusted position.

5. The combination of a plurality of shiftable members provided with detent receiving portions, a unitary member adapted to engage both of said portions and hold the members in adjusted position, and independent means engaging said member for yieldingly holding the latter in position.

6. The combination of a plurality of shiftable members provided with detent receiving portions, a unitary member adapted to engage both of said portions and hold the members in adjusted position, and independent means engaging said member for yieldingly holding the latter in position, means for locking said last named means against movement to positively lock said shiftable members.

7. A combination of a plurality of slidable members provided with unitary detent receiving portions, a detent adapted for engagement with both of said portions, means independent of said detent for yieldingly urging the latter to latching position, and means for positively limiting the amount of movement of said last named means so that but one of said members may be shifted at a time.

8. The combination of a plurality of shifter members, each provided with a plurality of detent receiving portions, a detent adapted to be normally received within a pair of detent receiving portions, means independent of said detent for yieldingly urging the latter to seating position, said members being provided with cutaway portions connecting said detent receiving portions, said cutaway portions and detent receiving portions forming channels the ends of which constitute stops cooperating with said detent to positively limit the movement of said members.

9. The combination of a plurality of shiftable members, each provided with a plurality of notches in adjacent sides, a member adapted for seating engagement in said notches to hold said members in adjusted position, a spring pressed follower for yieldingly urging said member to seating position, and means for locking said follower with said member in engagement with a pair of opposed notches to positively prevent movement of said members.

10. The combination of a pair of movable members, each provided on adjacent sides with a notch and with a cutaway portion communicating with said notch, means adapted to engage said notches to hold said parts in adjusted position, said means cooperating with the ends of said cutaway portions to limit the extent of movement of said members.

11. A shifter member provided on one side with a plurality of notches, reduced portions connecting said notches, and a detent adapted for yielding engagement with said notches and cutaway portions.

12. The combination of a plurality of slidable members, each having a plurality of notches in opposed sides, a locking anti-friction member adapted to seat in said notches and hold said members in adjusted position, means independent of said locking member for yieldingly urging said member into seating engagement, and means for positively locking said last named means in position to prevent withdrawal of said locking member from locking engagement.

13. The combination of slidable members, each having a plurality of notches in opposed sides, a ball adapted to seat in said notches, a reciprocating member engaging said ball, resilient means yieldingly urging said reciprocating member against said ball to hold the latter in seating position, and means for positively limiting the amount of movement of said reciprocating member to prevent simultaneous movement of both of said shifter members.

14. The combination of a plurality of shiftable members having notches in opposed faces, a housing mounted adjacent said members, a locking member loosely guided in the lower end of said housing and engaging said notches, and spring urged means in said housing yieldingly holding said member in engagement with said notches.

15. The combination of a plurality of shiftable members having notches in opposed faces, a housing mounted adjacent said members, a locking member loosely guided in the lower end of said housing and engaging said notches, a plunger in said housing, a spring for urging said plunger toward locking position, said plunger and housing being provided with cooperating abutments to limit the movement of the plunger and prevent said locking member from being dislodged from more than one of an opposed pair of abutments at a time.

16. The combination of a plurality of shiftable members having notches in opposed faces, a housing mounted adjacent said members, a locking member loosely guided in the lower end of said housing and engaging said notches, a plunger in said housing, a spring for urging said plunger toward locking position, said plunger and housing being provided with cooperating abutments to limit the movement of the plunger and prevent said locking member from being dislodged from more than one of an opposed pair of abutments at a time, means for locking said locking plunger in lowermost position.

In testimony whereof I affix my signature.

ROBERT NEEF.